Aug. 9, 1966  R. NILL  3,265,089
THREE-WAY SAFETY DOUBLE VALVE
Filed Dec. 10, 1964  3 Sheets-Sheet 1

INVENTOR
Rudolf Nill
Dicke & Craig
BY
ATTORNEYS

Aug. 9, 1966  R. NILL  3,265,089
THREE-WAY SAFETY DOUBLE VALVE
Filed Dec. 10, 1964  3 Sheets-Sheet 2

INVENTOR
Rudolf Nill
Dicke & Craig
BY
ATTORNEYS

INVENTOR
Rudolf Nill
Dicke & Craig
BY
ATTORNEY

United States Patent Office
3,265,089
Patented August 9, 1966

3,265,089
THREE-WAY SAFETY DOUBLE VALVE
Rudolf Nill, Faurndau, near Goeppingen, Germany, assignor to Concordia Maschinen- und Elektrizitats-Gesellschaft m.b.H., Stuttgart, Germany
Filed Dec. 10, 1964, Ser. No. 417,318
Claims priority, application Germany, Dec. 11, 1963, C 31,649; Oct. 17, 1964, C 34,131
22 Claims. (Cl. 137—596.16)

The present invention relates to a three-way double valve which, if a failure or breakdown occurs in the operation of the valve, automatically interrupts the supply of the pressure medium to be controlled, and which essentially consists of two three-way main control valves which are arranged in series relative to each other and are both connected to the same work-producing pressure chamber or cylinder, of two three-way safety valves, each of which is positively connected to the associated main control valve, and of auxiliary valves which are adapted to actuate both main control valves simultaneously and are preferably controlled electromagnetically.

It is an object of the present invention to provide a valve unit of the type as above described which is of a simple structure and has relatively small dimensions, is suitable for also controlling the flow of dry pressure media which do not contain oil, and is absolutely reliable in operation when used for controlling the flow of such dry pressure media.

According to the invention, this object is attained essentially by providing the main control valves as well as the safety valves of the valve unit in the form of flat-seat valves, by connecting one valve chamber of one of the safety valves to a leakage line, by connecting one valve chamber of the other safety valve to the intake line for the pressure medium in which at least one adjustable or nonadjustable throttle member is provided which has a free cross-sectional area or flow passage smaller than that of the leakage line, and by connecting the valve chambers of both safety valves with each other in such a manner that, when only one of these valves is opened, the inlet and leakage lines of the valve unit will communicate with each other.

One of the results of these features is that the initial pressure in the intake line is throttled in such a manner that, when the auxiliary valves are energized, the pressure will be sufficient to actuate the main control valves, while when a failure occurs in the operation of the valve mechanism, the initial pressure will be released through the leakage line which is controlled by the safety valves. Since no excess pressure can thus be built up between the throttle member and the open leakage line, there is no possibility that the main control valve might be operated.

Another feature of the invention consists in providing each main control valve with an upper and lower valve member which are designed so as to engage alternatively with their associated valve seats on an upper main valve chamber. When the upper valve members are in the open position, the upper main valve chambers communicate with the outlet line of the valve unit. For maintaining the upper valve members in the open position and for simultaneously pressing the lower valve members against the lower main valve seats, the valve unit is preferably provided with compression springs.

Another feature of the invention consists in connecting the main valve chamber which is located underneath the lower valve member of one of the main control valves with the intake line and in providing a connecting channel between the lower main valve chamber of the second main control valve and the upper main valve chamber of the first main control valve. The upper main valve chamber of the second main control valve may be connected to the outlet line leading to the working chamber.

According to another feature of the invention, each main control valve is provided above the upper valve member with a servo piston which is movable within a servo valve chamber. Each of these servo valve chambers may be connected through the associated auxiliary valve with the intake line.

Another very preferred feature of the invention consists in providing the servo pistons in the form of flexible diaphragms, the outer peripheral edges of which are secured to the walls of the servo valve chambers. Thus, there is no sliding friction between the servo pistons and the walls of the servo valve chambers and therefore no possibility of jamming of these pistons. Furthermore, a pair of fixed throttle members are preferably mounted in the intake line behind each other and are separated by a surge chamber. This arrangement has the advantage over a single throttle member in the intake line that the aperture size of these throttle members may be increased so that the danger will be avoided that they may become clogged by dirt. In addition it is advisable to provide a buffer chamber in the control channel between the two electromagnetic preliminary control valves. This buffer chamber should have a sufficient size so that when no breakdown occurs in the operation of the valve mechanism the pressure will be prevented from decreasing below the minimum value which is required for actuating the main control valves.

In a very preferred embodiment of the invention the main valve chambers of each main control valve and the associated safety valve chambers extend axially behind each other and suitable sealing means and a bearing for supporting the common valve shaft are provided between the main valve and safety valve chambers. These sealing means and the bearing are preferably separated from each other by an annular groove in the part of the valve housing surrounding the valve shaft between the main control and safety valve, and this groove is connected by radial bores with the main valve chamber, so that whenever the pressure medium flows through the valve unit, it will also flow through these radial bores and annular grooves. The sealing means preferably consist of self-lubricating O-rings or the like which are inserted into annular grooves in the mentioned parts of the valve housing surrounding the valve shafts, while the bearings for the two valve shafts consist of bushings of a self-lubricating material which are inserted into these housing parts. These means absolutely prevent the valve shafts from sticking or jamming within the valve housing without requiring any additional lubrication.

Each of the safety valves is preferably provided with three valve chambers. The upper and lower chambers of both valves are connected by channels with each other, while the central chamber of one safety valve is connected by a channel with the intake line and the central chamber of the other valve is connected with the leakage line. Furthermore, the two valve seats of one safety valve are located in the central chamber which is connected with the intake line, while one of the valve seats of the other safety valve is provided at the lower opening of the upper chamber and the other valve seat at the upper opening of the lower chamber. Thus, whenever one or the other valve member of these safety valves is closed, it will be additionally acted upon by the pressure medium so as to be pressed tightly against its associated valve seat. This valve structure has not only the advantage that the pressure medium itself improves the sealing action of the valve members, but also that such a valve unit may be manufactured at a relatively low cost since the connecting channels between the valve chambers of the two safety valves extend at right angles to the axes of the valves. However, despite the simplicity of this valve structure, the object of these valves is fully attained that, if only one valve member is actuated, the pressure in the control line will drop immediately below the minimum value which might still cause the main control valves to be actuated through the diaphragm pistons. The valve member which is actually still operative may then also be returned to the position in which the supply of the pressure medium is shut off from the working cylinder.

Another very advantageous feature of the invention consists in providing the safety valves in the form of valve disks which are resiliently secured to the valve shafts by means of O-rings so as to yield resiliently to a certain extent in the axial direction. This has the advantage that the valve unit according to the invention does not have to be made as accurately as it would otherwise be required and that therefore its costs of production may be relatively low.

It is also of great advantage to provide the main pressure line of the valve unit leading to and from the working cylinder with adjustable throttle members by means of which the flow of the pressure medium to be supplied to or released from the working cylinder may be regulated. For safety reasons, these throttle members should, however, be adjustable only down to a certain residual aperture size. If no pressure acts upon the upper side of the servo diaphragm on the common valve shaft, the valve disks may be pressed against their associated valve seats in a very simple manner by means of compression springs.

Further important advantages may be attained and the applicability of the valve mechanism according to the invention may be increased by combining two of the double-valve units as previously described with each other so that each of them supervises the other by connecting them by means of a pipe or a flexible hose in such a manner that, in the event that a failure or breakdown occurs in the operation of one valve unit, the connections of both units leading to different working cylinders will be relieved of pressure. For this purpose, the intake line of each valve unit is preferably provided at a point prior to its connection to the central chamber of the safety valve with a by-pass which may be closed by an adjustable throttle member. If the supply of pressure medium to the two working cylinders is throttled in one valve unit so as to be different from the other, the by-pass of the unthrottled valve unit should be closed by its throttle member. If, when the two valve units are switched on, a valve of one unit fails to be moved to its on-position, only the valve unit in which the failure occurred or both valve units will then indicate the failure by releasing the pressure medium through the leakage lines.

In order to prevent a loss of pressure medium when the valves are shifted from one position to the other, the valve members of the main control valve may be provided with preliminary valve members. For special purposes it is also possible to provide two three-way double valves side-by-side which are connected by conduits with each other.

The above-mentioned as well as further features and advantages of the present invention will become more clearly apparent from the following detailed description thereof which is to be read with reference to the accompanying drawings, in which—

FIGURE 2 shows a longitudinal section of another three-way double valve unit according to a modification of the invention; while

Figure 1:
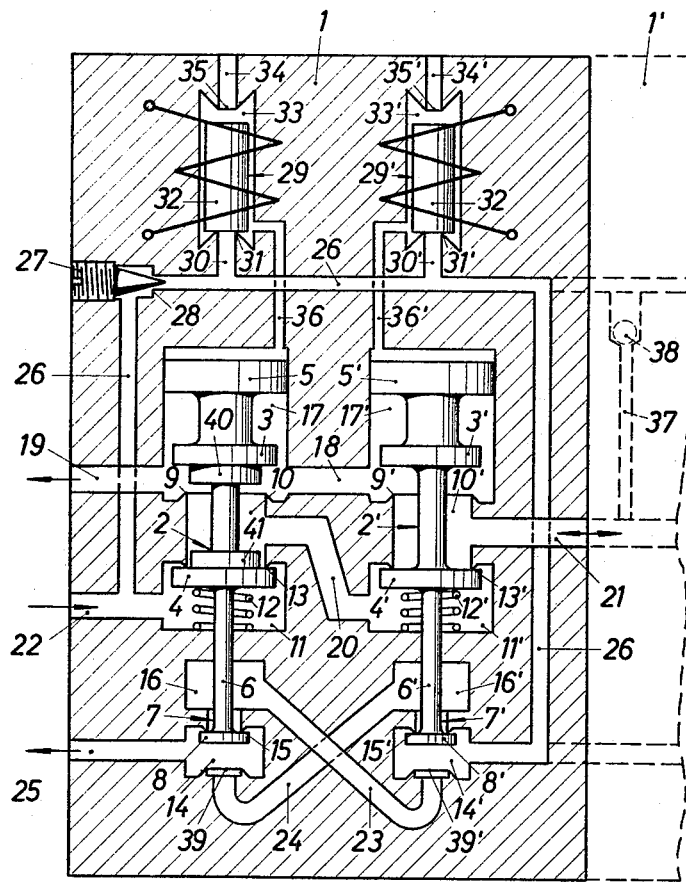
FIGURE 1 shows a longitudinal section of a three-way double valve unit according to the invention.

The three-way double valve according to a first embodiment of the invention as illustrated in FIGURE 1 comprises a valve housing 1 which contains two three-way main control valves 2 and 2' side-by-side and parallel to each other and movable in their longitudinal directions within the valve housing 1. Each of these valves 2 and 2' consists of an upper valve members 3 or 3', a lower valve member 4 or 4', a servo piston 5 or 5' above the upper valve member 3 or 3', and a valve member 8 or 8' of a three-way safety valve 7 or 7' which is located underneath the lower valve member 4 or 4' and is positively connected to the respective main control valve by the common shaft 6 or 6'. The upper valve members 3 and 3' of the main control valves 2 and 2' are located above the upper valve seats 9 and 9' of the upper main valve chambers 10 and 10', while the lower valve members 4 and 4' are located within the lower main valve chambers 11 and 11' and are normally pressed against the lower valve seats 13 and 13' of the upper main valve chambers 10 and 10' by compression springs 12 and 12' which at the same time also presses the valve members 8 and 8' in the lower valve chambers 14 and 14' against the upper valve seats 15 and 15' of the safety valves 7 and 7' so that the upper valve chamber 16 or 16' of each safety valve is thus normally closed relative to the lower valve chamber 14 or 14' of the same safety valve by one of the valve members 8 and 8'. The upper valve members 3 and 3' of the main control valves 2 and 2' together with the servo pistons 5 and 5' are movable within servo valve chambers 17 and 17'. These valve chambers have a larger diameter than the valve members 3, 3' and 4, 4', which, in turn, have a larger diameter than the valve members 8 and 8' of the safety valves 7 and 7'. The servo valve chambers 17 and 17' are connected to each other above the upper valve seats 9 and 9' of the main control valves 2 and 2' by a channel 18, and the servo valve chamber 17 is connected to an outlet channel 19. While the upper valve chamber 10 of the main control valve 2 is connected to the lower valve chamber 11' of the other main control valve 2' by a channel 20, the upper valve chamber 10' of the main control valve 2' is connected by a channel or conduit 21 to a working cylinder, not shown. The lower valve chamber 11 of the main control valve 2 is connected to the intake line 22.

The opposite valve chambers of the two safety valves 7 and 7' are connected to each other by connecting channels 23 and 24 which extend crosswise to each other so that the channel 23 extends from the lower valve chamber 14 to the upper valve chamber 16 and the channel 24 extends from the upper valve chamber 16' to the lower valve chamber 14. This lower valve chamber 14 is also connected to a leakage line 25, while the lower valve chamber 14' is connected to a feed channel 26 which branches off the intake channel 22. A setscrew 27 which may be adjusted from the outside of the valve housing 1 has a conical tip which extends into the feed channel 26 and forms a throttle valve 28 therein. The aperture size of this throttle valve 28 may thus be adjusted so as to be smaller than the diameter of the feed channel 26 and the leakage line 25.

At two points intermediate the throttle valve 28 and the lower safety valve chamber 14' the feed channel 26 is connected by branch channels 30 and 30' to the valve chambers 33 and 33' of two electromagnetically actuated preliminary control valves 29 and 29'. When these preliminary valves are not energized, the lower ends of their armatures 32 and 32' engage upon the valve seats 31 and 31' and close the channels 30 and 30', while the upper ends of these armatures are then spaced from the upper valve seats 35 and 35' so that the valve chambers 33 and 33' can communicate through the channels 34 and 34' with the outside. These valve chambers 33 and 33' also communicate through channels 36 and 36' with the servo valve chambers 17 and 17' of the main control valves 2 and 2'.

As indicated in FIGURE 1 by dotted lines, a second valve housing 1' of a second three-way double valve unit and containing the same elements as the first valve housing 1 may be mounted adjacent to the latter or be directly connected thereto. The two three-way double valve units are then connected to each other by extensions of the line 21 and the feed channel 26 and together form a safety valve unit. As also indicated by dotted lines, the feed channel 26 may also be connected to the line 21 by a conduit or channel 37 in which a check valve 38 is provided.

The manner of operation of the three-way double valve unit according to FIGURE 1 is as follows:

As long as the preliminary control valves 29 and 29' are not energized and the main control valves 2 and 2' and safety valves 7 and 7' are in the positions as shown, the pressure medium fills the intake channel 22 and the lower main valve chamber 11 from which it is prevented from flowing further by the engagement of the lower valve member 4 with the lower valve seat 13. However, the pressure medium can then flow from the inlet channel 22 through the feed channel 26 and the throttle valve 28 into the channels 30 and 30' as well as into the lower valve chamber 14' of the safety valve 7' and further through the channel 23 into the upper valve chamber 16 of the safety valve 7 which is closed by the valve member 8. The pressure medium is thus prevented from reaching the working cylinder which is then relieved of pressure by communicating with the outside through the line 21, the upper main valve chamber 10', the servo valve chamber 17', the channel 18, the servo valve chamber 17, and the outlet channel 19.

When the two preliminary control valves 29 and 29' are then energized, their armatures 32 and 32' are moved upwardly and against the valve seats 33 and 33' so that the outlet channels 34 and 35 are closed. The pressure medium can then flow from the feed channel 26 through the channels 30 and 30' and the valve seats 31 and 31' into the valve chambers 33 and 33' and further through the channels 36 and 36' into the servo valve chambers 17 and 17' in which the pressure medium will act upon the upper sides of the servo pistons 5 and 5' of the main control valves 2 and 2' which are thereby forced downwardly together with the safety valves 7 and 7' against the action of the compression springs 12 and 12' until the upper valve members 3 and 3' engage against the upper main valve seats 9 and 9', while the lower valve members 4 and 4' disengage from the lower main valve seats 13 and 13', and the valve members 8 and 8' of the safety valves 7 and 7' engage against the lower valve seats 39 and 39'. The connecting line 21 leading to the working cylinder is thereby shut off from the outlet channel 19, and the supply channel 26 is also shut off from the leakage line 25. The pressure medium can then, however, pass through the inlet channel 22, the lower and upper valve chambers 11 and 10 of the main control valve 2, the channel 20, and the lower and upper valve chambers 11' and 10' of the main control valve 2' into the line 21 which leads to the working cylinder.

If for any reason one of the two main control valves 2 or 2' and the associated safety valve 7 or 7' thereon is stuck and fails to move downwardly, the pressure medium may escape through one of these safety valves 7 or 7' and the leakage line 25. Assuming for example, that the main control valve 2 is stuck and fails to move downwardly from the position as shown in FIGURE 1, the pressure medium will pass from the feed line 26 through the lower and upper valve chambers 14' and 16' of the safety valve 7' and then through the channel 24 into the lower valve chamber 14 of the other safety valve 7 and then into the leakage line 25 since the valve seat 39 of this valve 7 is not closed by the valve member 8. Since the amount of pressure medium which can flow through the throttle valve 28 is smaller than the amount which may be discharged through the leakage line 25, no pressure will be built up in the valve system which could affect the position of the valves and therefore the main control valve 2' will be returned by the compression spring 12' to its initial position as shown in the drawing. If a small pressure is then again built up, a very small movement of the main control valve 2 in the downward direction will suffice to permit the pressure medium to flow to the leakage line 25. Consequently, the operation of the working cylinder will thereby be stopped.

The same effect will occur if for any reasons the other main control valve 2' might be stuck in the position as shown in FIGURE 1 and fail to move downwardly under the pressure acting upon the piston 5.

In order to prevent any loss of pressure medium due to leakage when the valves are shifted from one to the other position, the valve members 3 and 4 of the main control valve 2 are provided with preliminary valve members 40 and 41 which essentially consist of cylindrical projections on the valve members 3 and 4 and have a diameter slightly smaller than the diameter of the main valve chamber 10. When the main control valve 2 starts to move downwardly from the position as shown, the preliminary valve member 41 at first prevents the pressure medium from passing from the lower valve chamber 11 into the upper valve chamber 10. If in the meantime the preliminary valve member 40 has entered the upper valve chamber 10, there is no possibility for the pressure medium to pass from the inlet line 22 to the outlet line 19.

Figure 2:
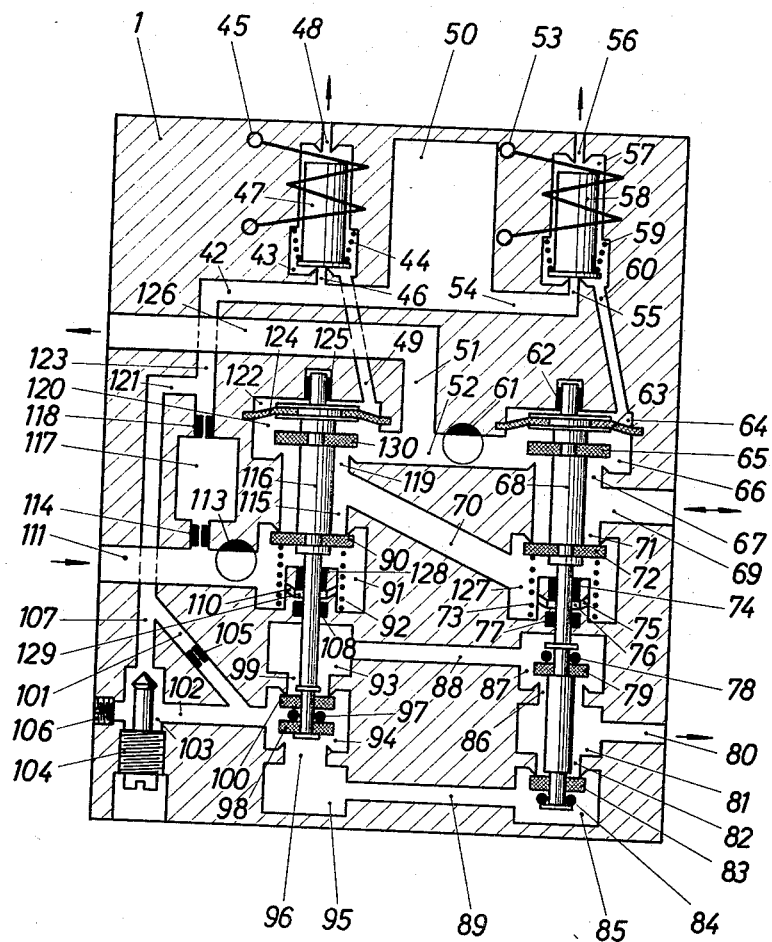

FIGURE 2 illustrates a three-way double valve unit according to a modification of the invention. It also comprises a housing 1 which contains two three-way main valve inserts 68 and 116 which operate according to the servo principle like the valve inserts 2 and 2' in FIGURE 1 and are likewise shown together with the associated control elements in their initial position. These main valve inserts 68 and 116 are connected with the associated electromagnetically actuated preliminary control valves 43 and 57 by suitable control conduits.

The pressure medium is supplied through the channel 111 and flows into the chamber 91 in which it acts upon the lower side of a valve disk 90 and thereby holds the valve seat 115 in the closed position and insures that the main valve insert 116 will be maintained in its initial position, as shown, to which it has been moved by the compression spring 92. The pressure medium has therefore no access to the connection 69 which leads to the working cylinder.

However, the pressure medium flows at the same time from the channel 111 through a fixed throttle 114 into a chamber 117 and then through another fixed throttle 118, the control channels 123 and 42, a buffer chamber 50, and a control channel 54 up to the nozzle bores 46 and 55, the upper ends of which are closed by the auxiliary valves 47 and 58 through the action of conical springs 44 and 59. From the control channel 123 the pressure medium flows further through the control channels 121 and 107, the chamber 103, and the control channel 102 into the valve chamber 94. In order to insure a proper functioning of the valve mechanism even in the event that inadvertently the by-pass setscrew 104 has been screwed too far inwardly into the control channel 107, a channel 101 is further provided which contains a fixed throttle 105 and permits the pressure medium to flow directly from the control channel 107 to the control channel 102 and then into the valve chamber 94. In this valve chamber 94, the pressure medium will act upon a valve disk 100 so as to maintain the valve seat 99 in the closed initial position as shown. This valve disk 100 is mounted on the valve shaft of the main valve insert 116, for example, by means of a so-called O-ring 97, so as to be resilient to a certain extent in the axial direction. From the valve chamber 94 the pressure medium may further pass through the lower valve seat 96, the chamber 95, and the control channel 89 to the valve chamber 85 in which it will likewise act upon a valve disk 83 which is mounted on the valve shaft of the other main valve insert 68, for example, by means of an O-ring 84, so as also to be resilient to a certain extent in the axial direction. Thus, the valve seat 82 of this valve will also be maintained in the closed initial position.

However, even without such action of the pressure medium, the compression spring 73 alone has a sufficient strength to maintain the main valve insert 68 in its initial position in which its valve disk 72 closes the upper valve seat 71 and the valve disk 82 presses resiliently against the lower valve seat 82. When the main valve insert 68 is in this initial position, the connection 69 to the working cylinder is relieved of pressure through the open valve seat 67, the valve chamber 66, and the channels 52, 51, and 126. This pressure release of a working cylinder which is connected to this connection 69 may be regulated by turning a throttle member 61 which for safety reasons is designed so that the channel 52 can be throttled down only to a certain minimum aperture size.

When both valve inserts are in the initial position as shown in FIGURE 2, the valve chamber 127 is likewise relieved of pressure through the channel 70, the valve seat 119, the valve chamber 120, and the channels 52, 51, and 126. The pressure is also released from the valve chamber 93 through the control channel 88, the valve chamber 87, the open valve seat 86, the chamber 81, and the leakage line connection 80. Furthermore, the control chambers 122 and 64 above the diaphragm pistons of the main valve inserts are also relieved of pressure through the channels 49 and 60, the preliminary control valves 43 and 57, and the nozzle bores 48 and 56, respectively.

The two valve chambers 91 and 127 are sealed relative to the chambers 93 and 87 by self-lubricating sealing rings 108 and 77, for example, O-rings. It is, however, also possible to employ sealing rings of rubber and underneath them self-lubricating slide rings for a dry operation. In order to maintain these sealing means as long as possible in the proper condition, annular grooves 129 and 76 are provided between the bushings 128 and 74 and the sealing rings 108 and 77, respectively. These annular grooves communicate with the chambers 91 and 127 through a pair of opposite radial bores 110 and 75, respectively, which are designed so that the annular grooves will be flushed by the pressure medium at every operation of the valve inserts. In this manner it is possible to reduce considerably any frictional wear upon the bushings and to prevent any accumulation of dirt or other matter which might deteriorate the sealing rings 108 and 77 or diminish their proper sealing action. The control chambers 122 and 64 are closed air-tight relative to the valve chambers 120 and 66 by diaphragms 124 and 63. At their upper ends, the main valve inserts are guided in bearing sockets 125 and 62, respectively. The by-pass setscrew 104 is screwed inwardly only so far that no throttling effect will be exerted upon the pressure medium at the point of connection between the chamber 103 and the control channel 107. This embodiment of the invention is also provided with a sealing screw 106 which has to be screwed in tightly.

When the field coils 45 and 53 are energized, the armatures 47 and 58 are pulled up so that the nozzle bores 48 and 56 are closed and the bores 46 and 55 are opened. The pressure medium will then flow through the bores 46 and 55 and the preliminary control valves 43 and 57 and then through the control channels 49 and 60 into the control chambers 122 and 64 in which the pressure medium acts upon the diaphragm pistons 124 and 63 so as to move the valve inserts 116 and 68 to the on position. The pressure medium can then flow from the channel 111 through the valve chamber 91, the open valve seat 115, the channel 70, the valve chamber 127, and the open valve seat 71 to the connection 69 which leads to the working cylinder. The charge of pressure medium which is to be supplied to the working cylinder may be regulated by turning the throttle member 113 which is designed like the throttle member 61 so as to permit the channel 111 to be throttled down only to a certain minimum aperture size.

The valve seats 119 and 67 are then closed by the valve disks 130 and 65. The valve chambers 120 and 66 are then relieved of pressure through the channels 52, 51, and 126. The valve seats 96 and 86 are also closed by the valve disks 98 and 79 which due to the O-rings 97 and 78 can yield resiliently to a limited extent in the axial direction on the valve shafts of the valve inserts 116 and 68. At the same time the valve seats 99 and 82 are opened so that the pressure medium in the valve chamber 94 can flow from this chamber through the open valve seat 99, the chamber 93, and the control channel 88 into the valve chamber 87 in which its acts upon the valve disk 79 so as to hold the valve seat 86 in the closed position. The pressure medium in the valve chamber 94 also acts upon the valve disk 98 so as to hold the valve seat 96 in the closed position. The pressure of the medium which then remains in the chamber 95 is released to the outside through the control channel 89, chamber 85, valve seat 82, chamber 81, and the control channel 80.

If the electric circuit of the field coils 45 and 53 is interrupted, the armatures 47 and 58 are returned by springs 44 and 59 to their initial positions. As already stated, the pressure in the control chambers 122 and 64 is then released to the outside through the preliminary control valves so that the main valve inserts 116 and 68 will be likewise moved back to their initial positions. The supply of pressure medium to the connection 69 leading to the working cylinder is then stopped and the pressure of the medium remaining in this connection 69 and the chamber 127 is released to the outside in the same manner as first described with reference to the initial position. The pressure in chamber 93 is likewise released. This cycle of operations is repeated whenever the preliminary control valves 47 and 58 are actuated.

If, for any reason the valve mechanism fails to operate so that, for example, one of the main valve inserts is not in the normal position to which it is to be moved when the field coil of its associated preliminary control valve is energized, the pressure medium contained in the chamber 91 will not be able to pass to the connection 69 leading to the working cylinder. Thus, for example, if the main valve insert 68 or the associated preliminary control valve 57 fails to move to the on position the pressure medium in the chamber 91 can flow through the open valve seat 115 and the channel 70 to the chamber 127, but it cannot flow further in the direction toward the connection 69 since the valve seat 71 is held in the closed position by the valve disk 72 which failed to move from its initial position. The connection 69 to the working cylinder is then relieved of pressure as in the initial position. Furthermore, the pressure of the medium coming from the control channels and contained in the chamber 94 is released to a certain minimum value through the open valve seat 99, the chamber 93, the control channel 88, the chamber 87, the open valve seat 86, the chamber 81, and the connection 80 to the leakage line.

If for any reason the armature 58 remains in the on position when the current is switched off, the main valve insert 68 also remains in the on position. The connection 69 to the working cylinder is then relieved of pressure through the open valve seat 71, the chamber 127, the channel 70, the valve seat 119, the chamber 120, and the channels 52, 51, and 126. The pressure medium from the control channels which is collected in chamber 94 is released to the outside through the valve seat 96, the chamber 95, the control channel 89, the chamber 85, the valve seat 82, the chamber 81, and the control channel 80. Since the control channels leading to the outside have a larger cross-sectional size than the fixed throttles 114 and 118, the pressure of the medium remaining at the nozzles 46 and 55 will decrease to a residual value lower than that which is required for shifting the main valve insert 116 to the on position. The residual pressure is, however, still so high that the main valve insert 68 will be maintained in the on position. If the field coils are then energized, the main valve insert 116 will remain in the initial position and the connection 69 to the working cylinder will remain without pressure. Consequently, until the cause for the failure of the valve mechanism has been eliminated, no pressure medium will be supplied through the connection 69 to the working cylinder regardless of how often the field coils are energized.

Figure 3:
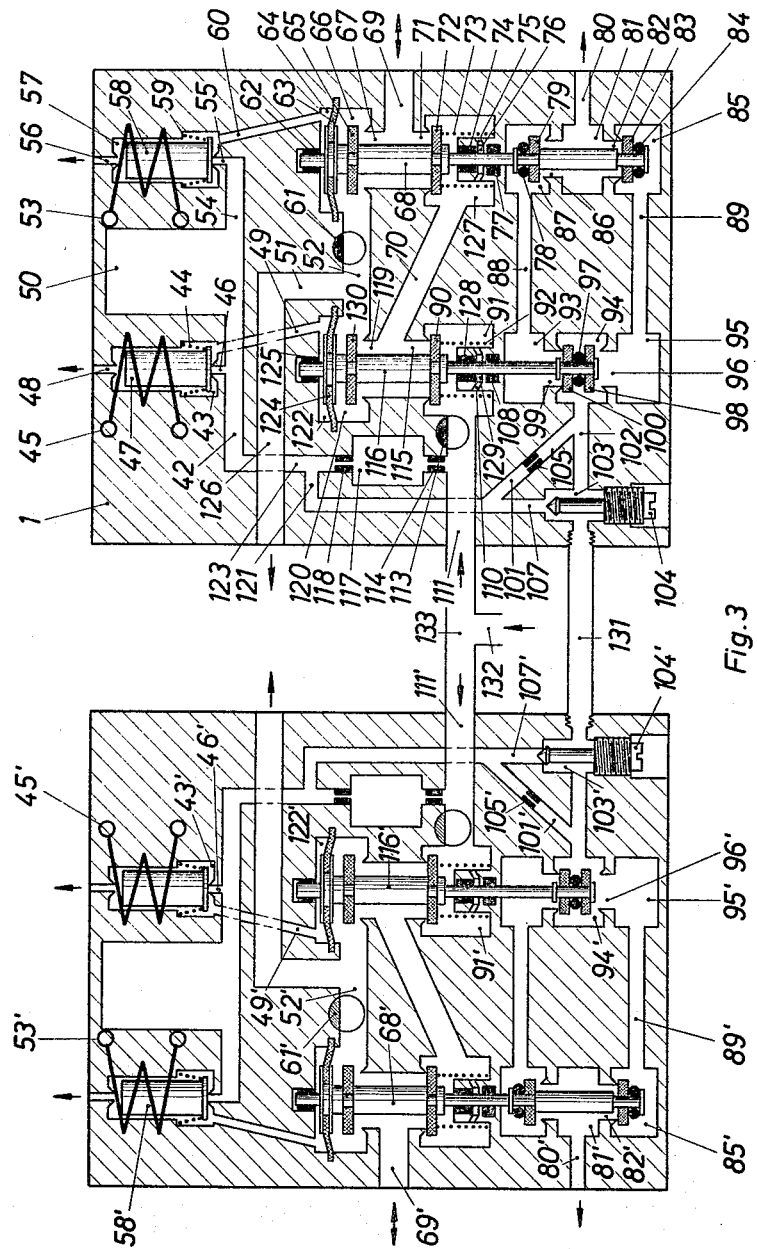
FIGURE 3 shows longitudinal sections of two interconnected three-way double valve units of the type as illustrated in FIGURE 2 in a symmetrical arrangement to each other.

FIGURE 3 illustrates two three-way double valve units of the same type as shown in FIGURE 2, but in inverse positions to each other. However, in both valve housings the sealing screw 106 according to FIGURE 2 is omitted and in place of these screws a pipe or hose line 131 is provided which connects the two valve units with each other to effect a mutual control. The by-pass setscrew 104' of the left valve unit is screwed fully inwardly so as to block the connection between the control channel 107' and the chamber 103'. Thus, the only connection remaining between the channel 107' and the channel 102 of the left valve unit is through the channel 101' and the fixed throttle insert 105' therein. In the following description of the manner of operation of the two valve units it is assumed that the two valve units are connected to a pneumatically operated press which is provided with a separate brake and clutch and that the left valve unit controls the operation of the brake cylinder and the right valve unit controls the operation of the clutch cylinder of this press.

The pressure medium is supplied through the line 132 from which it branches off through the channels 111 and 111' to both valve units which then operate in the same manner as already described with reference to the valve unit as shown in FIGURE 2. In order to insure that the brake cylinder which is connected to the connection 69' of the left valve unit will be filled more quickly than the clutch cylinder which is connected to the connection 69 of the right valve unit, the throttle member 113 of the right unit is turned so as to reduce the flow passage through the channel 111 to the desired size.

If, when the coils of both valve units are switched on, one of the armatures, for example, the armature 58' remains for any reason in its initial position, the main valve insert 68' will also remain in its initial position. The pressure medium in the chamber 91' is then prevented from flowing to the connection 69'. Consequently, the connection 69' then remains without pressure for the same reason as previously described with reference to FIGURE 2 as regards the connection 69 to the working cylinder. The brake cylinder which is connected to the connection 69' is thus also relieved of pressure and the brake remains in the locked position.

The right valve unit is switched on only for a very short time. However, even before the pressure medium can act upon the clutch cylinder and the clutch can thereby be engaged, this valve unit will fail to operate inasmuch as the main valve insert 116 will move back to its initial position so that the pressure medium in the chamber 91 will be prevented from flowing to the connection 69 and the clutch cylinder will be relieved of pressure. Although the original cause for the failure lies within the left valve unit, the right valve unit will thus also fail to operate. In greater detail, the proceedings are as follows:

During the period in which the main valve insert 116' of the left valve unit is in the on position, the pressure of the pressure medium from the control channels of both valve units will be released to the outside, except for a certain residual pressure which is so small that at first the valve insert 116 will be moved back to its initial off position, while the valve insert 68 remains in the on position. Thus, the right valve unit is stopped from further operation. The pressure medium from the control channels of both valve units is then released to the outside also through the control channel 80 so that the valve insert 116' of the left valve unit will return very quickly to its initial position. In the left valve unit both valve inserts are now in the initial off position, while in the right valve unit one of the valve inserts is in the off position and the other is in the on position. The right valve unit then remains in this position until the electric circuit is interrupted. If the field coils are then again energized, the same procedure will again occur as has already been described. The failure must therefore first be eliminated before the brake and clutch cylinders will again be supplied with pressure medium by the two valve units. All other possible failures in the operation of the two valve units will produce similar results as those described above.

If for any reason a breakdown occurs when the two valve units are switched off and one of the four valve inserts remains in the on position, the working cylinders will continue to be relieved of pressure. Furthermore, the pressure medium from the control channels of both valve units will be released to the outside at the valve unit where the breakdown occurred. If the field coils are again energized, the valve units will therefore remain inoperative as long as the cause for the breakdown has not been found and eliminated.

For the purpose of illustration, a breakdown will now be described which may occur when the valve units are being switched off. Assuming that, for example, the armature 58' remains in its on position after the electric circuit of the filed coils 45, 53, 45', and 53' has been interrupted, the associated valve insert 68' will also remain in its on position. The pressure medium in the control channels of both valve units which communicates with the chamber 94' is then released through the valve seat 82', the chamber 81', and the control channel 80' to the outside, but only to such an extent that the valve insert 68' will remain in its on position. If the field coils are then again energized, also the other valve inserts 116', 116, and 68 will be acted upon by the pressure medium which passes from nozzles 46', 46, and 55 through the preliminary control valves 43', 43, and 57 and the control channels 49', 49, and 60 into the chambers 122', 122, and 64. The strength of the small residual pressure is, however, not sufficient to move the other valve inserts to the on position. The valve unit in which the breakdown occurred therefore prevents the entire valve mechanism from being switched on until the cause for the breakdown has been eliminated.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A three-way double valve unit for controlling the flow of a pressure medium to a pressure-operated apparatus and adapted, when a failure occurs in the operation of said valve unit, to interrupt said flow, said valve unit comprising a valve housing, a main intake conduit within said housing adapted to be connected to a supply line for said pressure medium, a pair of three-way main control valves arranged in series in said housing and both connected to said main intake conduit and adapted to communicate with at least one outlet adapted to be connected to said apparatus, a pair of chambers in said housing above said main control valves, a pair of three-way safety valves, each positively connected to one of said main control valves so as to be movable thereby, said main control valves and said safety valves having substantially flat valve members for opening and closing the associated valve seats of said valves, a feed conduit within said housing connected to said main intake conduit, a pair of preliminary control valves each connected with said feed line and with said chamber above the associated main control valve for moving the latter by said pressure medium to the on position when said preliminary control valve is opened, means for moving said preliminary control valves from the closed to the open position and for moving said main control valves simultaneously to the on position when both of said preliminary valves are opened simultaneously, each of said safety valves having at least one valve chamber, one of said safety valve chambers being connected to said feed line, a leakage conduit in said housing and connected to the other safety valve chamber and leading to the outside, at least one throttle member in said feed line for reducing the effective cross-sectional area of said feed line to a size smaller than that of said leakage line, and conduits connecting said safety valve chambers with each other in such a manner that, when only one of the valve members of said safety valves is opened by the associated main control valve, said feed and leakage conduits communicate with each other.

2. A three-way double valve unit as defined in claim 1, wherein each of said main control valves comprises an upper valve chamber and a lower valve chamber, said upper valve chamber having a valve seat on both open ends thereof, and an upper valve member and a lower valve member adapted alternately to engage upon the associated valve seats on said upper valve chamber, an outlet conduit in said housing leading to the outside, said upper valve chambers of both main control valves communicating with said outlet conduit when said upper valve members of both main control valves are in the open position.

3. A three-way double valve unit as defined in claim 2, further comprising compression springs for pressing said lower valve members of both main control valves against the lower main valve seats of said main valve chambers.

4. A three-way double valve unit as defined in claim 2, wherein said lower valve chamber of the first main control valve located underneath said lower valve member thereof communicates directly with said intake conduit for the pressure medium.

5. A three-way double valve unit as defined in claim 4, further comprising a conduit in said housing connecting said lower valve chamber of the second main control valve located underneath said lower valve member thereof with said upper valve chamber of the first control valve.

6. A three-way double valve unit as defined in claim 5, further comprising a conduit in said housing connecting said upper valve chamber of the second main control valve with said outlet which is adapted to be connected to said apparatus.

7. A three-way double valve unit as defined in claim 2, wherein each of said chambers above said main control valves forms a servo valve chamber, each of said main control valves further comprising a servo piston secured to and located above said upper valve member and slidable within one of said servo valve chambers, and conduits connecting both servo valve chambers with said preliminary control valves and with said feed line.

8. A three-way double valve unit as defined in claim 7, wherein each of said servo pistons consists of a diaphragm centrally secured to the upper end of one of said main control valves and at its peripheral outer edge to the wall of the associated servo valve chamber.

9. A three-way double valve unit as defined in claim 1, wherein said feed line contains two fixed throttle members behind each other but separated by a chamber.

10. A three-way double valve unit as defined in claim 1, wherein said feed conduit comprises a conduit connecting said preliminary control valves with each other, and a buffer chamber connected to said connecting conduit and having such a size that at the normal operation of said valve unit the pressure will not decrease below the minimum value required for actuating said main control valves.

11. A three-way double valve unit as defined in claim 7, further comprising a pair of valve shafts parallel to and spaced from each other and each carrying said valve members of one of said main control valves and of the associated safety valve and also the associated servo piston, said main valve and safety valve chambers associated with each main control valve extending in the axial direction of the associated valve shaft, a housing part surrounding a part of each of said shafts, sealing means and bearing means for each of said shafts mounted in said housing part and separated from each other by at least one annular groove and radial bores communicating with said groove in said housing part and adapted to be flushed by the pressure medium at each actuation of said main control valves.

12. A three-way double valve unit as defined in claim 11, wherein said sealing means consist of self-lubricating sealing rings inserted into annular grooves in said housing parts surrounding and guiding said shafts.

13. A three-way double valve unit as defined in claim 11, wherein said bearing means for said shafts consist of bushings of a self-lubricating material inserted into said housing parts surrounding said shafts.

14. A three-way double valve unit as defined in claim 1, wherein each of said safety valves is provided with three valve chambers above each other, and conduits in said housing connecting the upper chambers and the lower chambers of both safety valves with each other.

15. A three-way double valve as defined in claim 14, wherein the central chamber of one of said safety valves communicates with said intake conduit and the central chamber of the other safety valve communicates with said leakage conduit.

16. A three-way double valve unit as defined in claim 1, wherein each of said safety valves has an upper, a lower, and a central valve chamber, said valve seats of one of said safety valves being provided around the upper and lower openings of said central valve chamber thereof, said valve seats of the other safety valve being provided around the lower opening of the upper valve chamber and the upper opening of the lower valve chamber of said other safety valve, so that in each position of each of said safety valves one of the valve members thereof is pressed by the pressure medium tightly against the associated valve seat.

17. A three-way double valve as defined in claim 7, further comprising a pair of valve shafts parallel to and spaced from each other and each carrying said valve members of one of said main control valves and of the associated safety valve and also the associated servo piston, said valve members of said safety valves consisting of valve disks secured to the associated valve shaft by means of O-rings so as to be resilient to a certain extent in the axial direction of said shaft.

18. A three-way double valve unit as defined in claim 1, wherein said intake conduit forms a part of a main pressure conduit adapted to be connected to said pressure supply line and connected to said outlet leading to said apparatus and to another outlet for releasing the pressure to the outside, and adjustable throttle members in said main pressure conduit for regulating the supply of pressure to and the release of of pressure from said apparatus and adapted to reduce the effective cross-sectional area of said main pressure conduit only down to a certain minimum size required for safety reasons.

19. A three-way double valve unit as defined in claim 7, further comprising compression springs for pressing the lower valve disks of said main control valves against their associated valve seats when no pressure is exerted by the pressure medium upon the upper sides of said servo pistons.

20 A three-way double valve unit as defined in claim 1, further comprising a preliminary valve member secured to each valve member of at least one of said main control valves.

21. A three-way double valve unit as defined in claim 1, wherein each of said preliminary control valves comprises an armature of an electromagnet, and said means for moving said preliminary control valves comprise the field coils of said electromagnets.

22. The combination of two valve units as defined in claim 14, for supervising the operation of each other, comprising a conduit connecting said two units to each other in such a manner that when a failure occurs in the operation of one valve unit, the connections of both units to two pressure-operated apparatus are relieved of pressure, one of said valve units being adapted to supply a greater amount of pressure medium to the apparatus connected thereto than the other valve unit, an adjustable throttle member in said feed line of each valve unit at a part thereof preceding its connection to the central chamber of one of said safety vales, said throttle member being closed in the valve unit supplying the greater amount of pressure medium so that, if a failure occurs in one valve unit when both valve units are switched on, the valve unit in which the failure occurred will indicate said failure by releasing the pressure medium through its leakage conduit to the outside.

References Cited by the Examiner
UNITED STATES PATENTS

| | | | |
|---|---|---|---|
| 3,108,612 | 10/1963 | Hofmann et al. | 137—596.16 |
| 3,135,289 | 6/1964 | Jordan | 137—596.16 |

MARTIN P. SCHWADRON, *Primary Examiner.*